(12) United States Patent
Kwon et al.

(10) Patent No.: US 10,545,611 B2
(45) Date of Patent: Jan. 28, 2020

(54) TOUCH INPUT DEVICE AND METHOD FOR MANUFACTURING THE SAME

(71) Applicant: Hyundai Motor Company, Seoul (KR)

(72) Inventors: Gideok Kwon, Seoul (KR); Jong Bok Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 47 days.

(21) Appl. No.: 15/260,816

(22) Filed: Sep. 9, 2016

(65) Prior Publication Data

US 2017/0075494 A1 Mar. 16, 2017

(30) Foreign Application Priority Data

Sep. 15, 2015 (KR) .......................... 10-2015-0130586
Jul. 6, 2016 (KR) .......................... 10-2016-0085426

(51) Int. Cl.
*G06F 3/041* (2006.01)
*G06F 3/044* (2006.01)
(Continued)

(52) U.S. Cl.
CPC ............ *G06F 3/0418* (2013.01); *B29C 59/16* (2013.01); *C23C 18/1603* (2013.01);
(Continued)

(58) Field of Classification Search
CPC ...... G06F 3/041; G06F 3/0416; G06F 3/0418; G06F 3/044; G06F 2203/04102–04104;
(Continued)

(56) References Cited

U.S. PATENT DOCUMENTS 5,599,592 A * 2/1997 Laude ................... C23C 18/22
216/65
2007/0014975 A1 1/2007 Ota
(Continued)

FOREIGN PATENT DOCUMENTS

JP 2007-027312 A 2/2007
JP 2013-527689 A 6/2013
(Continued)

OTHER PUBLICATIONS

European Search Report for European Patent Application No. 16188801.1, dated Jan. 24, 2017, 11 pages.
(Continued)

*Primary Examiner* — Nathan Danielsen
(74) *Attorney, Agent, or Firm* — Mintz Levin Cohn Ferris Glovsky and Popeo, P.C.; Peter F. Corless

(57) ABSTRACT

A touch input device and a method for manufacturing the same are disclosed. The touch input device includes: a first base including a metal compound; a first pattern groove formed over one surface of the first base; a first sense pattern formed over the first pattern groove and including a conductive material; a second base stacked over the first base, and configured to include a metal compound; a second pattern groove formed over one surface of the second base; a second sense pattern formed over the second pattern groove, including a conductive material, and spaced apart from the first sense pattern; and a line unit connecting the first sense pattern and the second sense pattern to an integrated-circuit.

19 Claims, 23 Drawing Sheets

(51) Int. Cl.
  *B29C 59/16* (2006.01)
  *C23C 18/16* (2006.01)
  *C23C 18/38* (2006.01)
  *B29L 31/34* (2006.01)

(52) U.S. Cl.
  CPC ...... *C23C 18/1637* (2013.01); *C23C 18/1639* (2013.01); *C23C 18/38* (2013.01); *G06F 3/044* (2013.01); *G06F 3/0416* (2013.01); *B29L 2031/34* (2013.01); *G06F 2203/04102* (2013.01); *G06F 2203/04103* (2013.01); *G06F 2203/04104* (2013.01); *G06F 2203/04111* (2013.01)

(58) Field of Classification Search
  CPC ....... G06F 2203/04111; C23C 18/1603; C23C 18/1637–1641; C23C 18/166; C23C 18/38; B23C 59/16; B23C 59/165; B29L 2031/34; B29L 2031/3425; B29L 2031/3475
  See application file for complete search history.

(56) References Cited

U.S. PATENT DOCUMENTS

| | | |
|---|---|---|
| 2008/0278453 A1 | 11/2008 | Reynolds et al. |
| 2010/0103138 A1 | 4/2010 | Huang et al. |
| 2010/0245246 A1* | 9/2010 | Rosenfeld ............ G06F 3/03543 345/163 |
| 2010/0263919 A1 | 10/2010 | Lee et al. |
| 2011/0298747 A1* | 12/2011 | Kim ..................... G06F 3/044 345/174 |
| 2013/0100041 A1 | 4/2013 | Golovchenko et al. |
| 2014/0041904 A1 | 2/2014 | Pedder |
| 2014/0210768 A1 | 7/2014 | Badaye et al. |
| 2014/0353012 A1* | 12/2014 | Zhao ..................... G06F 3/044 174/254 |
| 2014/0354301 A1 | 12/2014 | Trend |
| 2015/0077350 A1 | 3/2015 | Hinson |
| 2015/0091820 A1 | 4/2015 | Rosenberg et al. |
| 2015/0091859 A1* | 4/2015 | Rosenberg .............. G06F 3/044 345/174 |
| 2015/0097801 A1 | 4/2015 | Trend et al. |
| 2015/0100254 A1 | 4/2015 | Chen et al. |
| 2015/0205424 A1 | 7/2015 | Park et al. |
| 2016/0103532 A1* | 4/2016 | Jaw ........................ G06F 3/047 345/173 |
| 2016/0147375 A1 | 5/2016 | Bok et al. |
| 2016/0239131 A1 | 8/2016 | Kang |

FOREIGN PATENT DOCUMENTS

| | | |
|---|---|---|
| JP | 2014-063857 A | 4/2014 |
| KR | 2013-0078578 A | 7/2013 |
| KR | 10-1307940 B1 | 10/2013 |
| KR | 10-2014-0112387 A | 9/2014 |
| KR | 2014-0127734 A | 11/2014 |
| KR | 2014-0127735 A | 11/2014 |
| KR | 2014-0141498 A | 12/2014 |
| WO | 2013/181781 A1 | 12/2013 |

OTHER PUBLICATIONS

European Search Report for European Patent Application No. 16188737.7, dated Jan. 24, 2017, 12 pages.
Paik et al., "Study on th Formation Mechanism of Electroless Planting Seeds on Polymer by Laser", Jan. 2012, J of the Korean Society for Precision Engineering, vol. 29, No. 1, pp. 41-47.
Non-Final Office Action dated Dec. 29, 2017 in corresponding U.S. Appl. No. 15/258,670.
Final Office Action dated Jul. 11, 2018 in corresponding U.S. Appl. No. 15/258,670.
Non-Final Office Action dated Dec. 5, 2018 in corresponding U.S. Appl. No. 15/258,670.
Final Office Action dated Mar. 28, 2019 in corresponding U.S. Appl. No. 15/258,670.
Non-Final Office Action dated Jul. 30, 2019 in corresponding U.S. Appl. No. 15/258,670.

* cited by examiner (a)

(b)

TOUCH INPUT DEVICE AND METHOD FOR MANUFACTURING THE SAME

CROSS-REFERENCE TO RELATED APPLICATION

This application claims the benefit of and priority to Korean Patent Application Nos. 10-2015-0130586 and 10-2016-0085426, respectively filed on Sep. 15, 2015 and Jul. 6, 2016 in the Korean Intellectual Property Office, the disclosure of which is incorporated herein by reference in its entirety.

BACKGROUND

1. Technical Field

Embodiments of the present disclosure relate generally to a touch input device and a method for manufacturing the same and, more particularly, to a touch input device in which an electrode is installed using laser processing and a method for manufacturing the same.

2. Description of the Related Art

Various methods for implementing touch input devices configured to be operated by a user's touch have been widely used, including, for example, a resistive method, a capacitive method, a surface ultrasonic method, a transmitter method, etc. The capacitive-based touch input device, in particular, forms electrode patterns to cross each other. When an input part, such as a user's finger, touches the capacitive-based touch input device, the capacitive-based touch input device detects a touch input position by detecting change of capacitance between electrodes. Alternatively, the other capacitive-based touch input device applies action potentials having the same phase to both ends of a transmission conductive film, and detects a touch input position by detecting a weak current flowing when capacitance is formed by a touch input part (e.g., a finger) contacting or approaching the touch input device.

Generally, the touch input device is formed of a two-panel stacked structure in which a first panel is bonded to a second panel through adhesive. The first panel may include a plurality of first sense patterns arranged over a first substrate in a first direction (e.g., X-axis direction) and a plurality of first metal patterns electrically connected to a sensor circuit calculating the position of the first sense patterns. The second panel may include a plurality of second sense patterns arranged over a second substrate in a second direction (e.g., Y-axis direction) and a plurality of second metal patterns electrically connected to a sensor circuit calculating the position of the second sense patterns.

Korean Patent Laid-Open Publication No. 10-2008-0110477 has disclosed a similar capacitive touch panel having a one-film and double-layered structure.

In addition, various methods for manufacturing the touch input devices have been widely used, including, for example, a method of using an indium tin oxide (ITO) film acting as a transparent electrode for touch panel application, a method of using a metal mesh, a method of using a flexible printed circuit board (FPCB), etc. However, the above-mentioned manufacturing processes require a plurality of fabrication processes, resulting in processes that are complicated and expensive fabrication costs. Specifically, the ITO-based fabrication process uses rare-earths, and such production costs greatly increase due to the use of high-priced materials.

In addition, the conventional fabrication processes are configured to use the adhesive or bonding method, so that the conventional fabrication processes are vulnerable to external vibration and impact or high heat. As a result, durability of products is deteriorated, and it is difficult to apply the conventional fabrication processes to other devices in which vibration or high heat occurs.

SUMMARY

It is an aspect of the present disclosure to provide a touch input device capable of forming an electrode without using an adhesive or bonding method, and a method for manufacturing the same.

Additional aspects of the disclosure will be set forth in part in the description which follows and, in part, will be apparent from the description, or may be learned by practice of the disclosure.

In accordance with an embodiment of the present disclosure, a touch input apparatus includes: a first base including a metal compound; a first pattern groove formed over one surface of the first base; a first sense pattern formed over the first pattern groove and including a conductive material; a second base stacked over the first base, and configured to include a metal compound; a second pattern groove formed over one surface of the second base; a second sense pattern formed over the second pattern groove, including a conductive material, and spaced apart from the first sense pattern; and a line unit connecting the first sense pattern and the second sense pattern to an integrated-circuit.

The first sense pattern and the second sense pattern may be perpendicular to each other on the basis of the second base interposed therebetween.

The touch input apparatus may further include: a controller configured to receive signals regarding capacitance of the first sense pattern and the second sense pattern so as to interpret an input touch signal.

The first sense pattern may include a plurality of columns; the second sense pattern may include a plurality of columns perpendicular to the first sense pattern on the basis of the second base interposed between the first and second sense patterns; and the controller may be configured to interpret the input touch signal through capacitance information received from a plurality of intersection parts at which the first sense pattern and the second sense pattern are formed to cross each other.

Each of the first and second bases may include: a resin including at least one of: Polycarbonate (PC), Polyamide (PA), and acrylonitrile-butadiene-styrene copolymer (ABS); and a metal oxide including at least one of magnesium (Mg), chrome (Cr), copper (Cu), barium (Ba), iron (Fe), titanium (Ti), and aluminum (Al).

The first base may be coated over a surface formed of resin, glass, or leather.

A lower part of the first sense pattern may be accommodated in the first pattern groove formed over a front surface of the base and an upper part of the first sense pattern protrude from the surface of the first base; and a lower part of the second sense pattern may be accommodated in the second pattern groove formed over the surface of the base, and an upper part of the second sense pattern protrude from the surface of the second base.

A half of the first sense pattern may be accommodated in the first pattern groove, and the remaining half of the first sense pattern may protrude from one surface of the first base; and a half of the second sense pattern may be accommodated in the second pattern groove, and the remaining half of the second sense pattern may protrude from one surface of the second base.

The first base may have a thickness of X mm. The first sense pattern may protrude from one surface of the first base by a thickness of a μm, and the second sense pattern may be recessed from one surface of the second base by a thickness of b μm. The thickness (Y μm) of the second base may satisfy the following equation 1, $(a+b)\mu m < Y \mu m < -1210 \mu m*2(X mm-1.0 mm)/1 mm+1350 \mu m.$ [Equation 1]

The first sense pattern may protrude from one surface of the first base by a thickness of 10 μm, and the second sense pattern may be recessed from one surface of the second base by a thickness of 10 μm.

The first base may have a thickness range of 10 mm<X<1.55 mm.

The first base may have a thickness of 1 mm. The first sense pattern may protrude from one surface of the first base by a thickness of 10 μm, and the second sense pattern may be recessed from one surface of the second base by a thickness of 10 μm. The thickness (Y μm) of the second base may satisfy the following equation 2, $20 \mu m < Y \mu m < 1350 \mu m.$ [Equation 2]

The first base may have a thickness of 1.5 mm. The first sense pattern may protrude from one surface of the first base by a thickness of 10 μm, and the second sense pattern may be recessed from one surface of the second base by a thickness of 10 μm. The thickness (Y μm) of the second base may satisfy the following equation 3, $20 \mu m < Y \mu m < 140 \mu m.$ [Equation 3]

Each of the first sense pattern and the second sense pattern may be integrated with the line unit.

The first base may be formed to extend to a region in which the line unit is provided.

In accordance with another embodiment of the present disclosure, a touch input apparatus includes: a first base, a top surface of which is used as a touch surface to which a touch signal is input, and configured to include a metal compound; a first pattern groove formed over a bottom surface of the first base; a first sense pattern formed in the first pattern groove, and configured to include a conductive material; a second base stacked over the bottom surface of the first base, and configured to include a metal compound; a second pattern groove formed over the bottom surface of the second base; and a second sense pattern formed in the second pattern groove, including a conductive material, and spaced apart from the first sense pattern.

In accordance with another embodiment of the present disclosure, a touch input apparatus includes: a basic material, a top surface of which is used as a touch surface to which a user's touch signal is input; a first base stacked over a bottom surface of the basic material, and configured to include a metal compound; a first pattern groove formed over a bottom surface of the first base; a first sense pattern formed in the first pattern groove, and configured to include a conductive material; a second base stacked over the bottom surface of the first base, and configured to include a metal compound; a second pattern groove formed over a bottom surface of the second base; and a second sense pattern formed in the second pattern groove, including a conductive material, and spaced apart from the first sense pattern.

In accordance with another embodiment of the present disclosure, a method for manufacturing a touch input apparatus includes: providing a first base including a metal compound; forming a first pattern groove by irradiating laser light to one surface of the first base; forming a first sense pattern in the first pattern groove through a plating or deposition process; stacking a second base including a metal compound over the first base; forming a second pattern groove by irradiating laser light to one surface of the second base; forming a second sense pattern spaced apart from the first sense pattern over the second pattern groove through a plating or deposition process; and providing a current to the first and second sense patterns, determining a change of capacitance between the two sense patterns, and determining whether the two sense patterns are used as a sensor on the basis of the determined change of capacitance.

The method may further include: determining a change of mutual capacitance between the first and second sense patterns, and determining whether the first and second sense patterns are capable of being used as a sensor according to the determined change of mutual capacitance.

The first sense pattern and the second sense pattern may be formed by a Laser Directing Structuring (LDS) method.

The method may further include: investigating whether the second base has a constant thickness after stacking the second base.

BRIEF DESCRIPTION OF THE DRAWINGS

These and/or other aspects of the disclosure will become apparent and more readily appreciated from the following description of the embodiments, taken in conjunction with the accompanying drawings of which:

In more detail, FIG. 7 is a conceptual diagram illustrating a method for preparing a first base, FIG. 8 is a conceptual diagram illustrating a method for fabricating a first pattern groove, FIG. 9 is a conceptual diagram illustrating a method for forming a first sense pattern, FIG. 10 is a conceptual diagram illustrating a method for stacking a second base, FIG. 11 is a conceptual diagram illustrating a method for fabricating a second pattern groove, FIG. 12 is a conceptual diagram illustrating a method for forming a second sense pattern, and FIG. 13 is a conceptual diagram illustrating a method for stacking a coating layer.

DETAILED DESCRIPTION OF THE EMBODIMENTS

Figure 1:
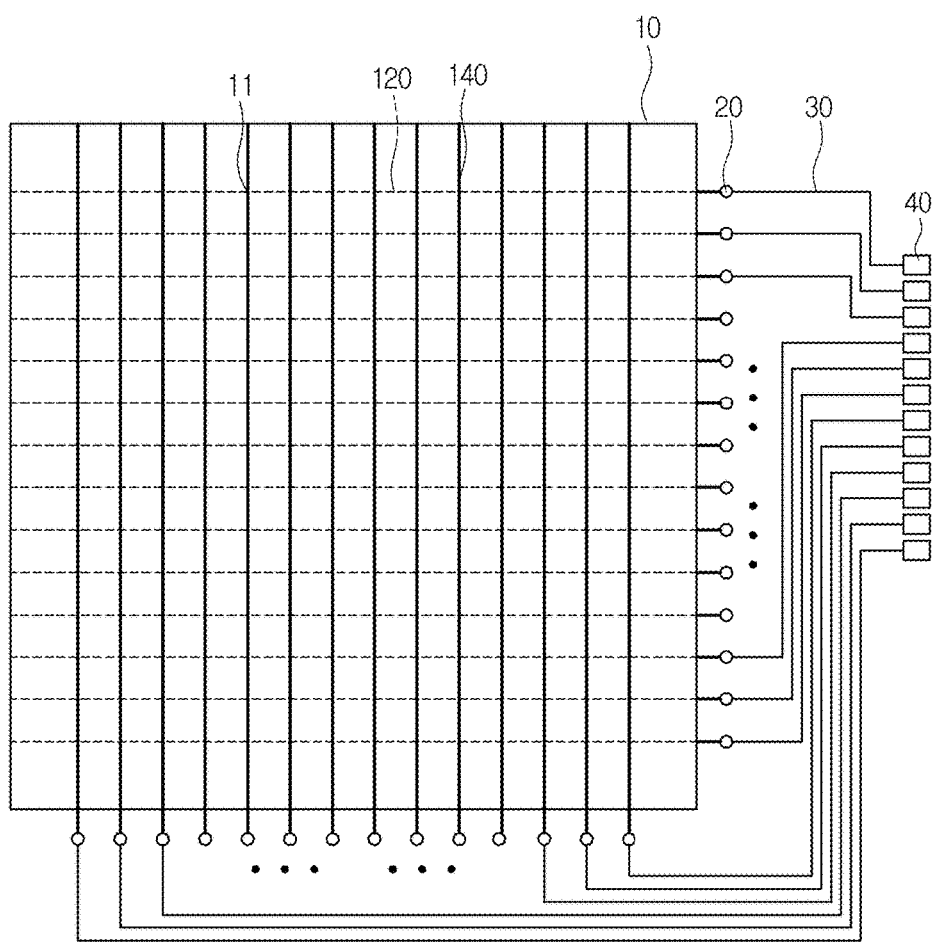
FIG. 1 is a structural view illustrating electrode arrangement appearance of a touch input device according to a first embodiment of the present disclosure.

Reference will now be made in detail to the embodiments of the present disclosure, examples of which are illustrated in the accompanying drawings, wherein like reference numerals refer to like elements throughout. In the following description of the present disclosure, a detailed description of known functions and configurations incorporated herein will be omitted when it may make the subject matter of the present disclosure rather unclear. In the drawings, elements unrelated to the embodiments of the present disclosure are omitted for clarity and the size of the components may be exaggerated for easy understanding.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

The touch input device may be configured in the form of a touchpad or touch panel. The touch input device may receive an input signal through contact (or approach) of an input unit, such as a user's finger, a stylus, or the like, and may recognize the contact (or approach) position.

The touchpad has been generally used as an input unit of laptops or the like, and has recently been used as an input unit of vehicles. The touch panel is a kind of an interactive graphic input device through which the user who views a display screen can directly designate a desired position.

FIG. 1 is a structural view illustrating a touch input device 100 according to the present disclosure.

FIG. 1 is a structural view illustrating electrode arrangement appearance of a touch input device 100 according to a first embodiment of the present disclosure. In more detail, FIG. 1 is a plan view illustrating a method for operating the touch input device 100, although different from the actual view. The touch input device 100 may include a touch unit 10 configured to contact a user input unit (e.g., a finger or a touch pen); sense patterns (120, 140) incorporated with the touch unit 10 or located below the touch unit 10; and a line (or wiring) unit 30 and a connection pad 40 connected to the sense patterns (120, 140).

The sense patterns (120, 140) may include a first sense pattern 120 and a second sense pattern 140. The first sense pattern may be a transmission (Tx) electrode, and the second sense pattern may be a reception (Rx) electrode.

Each of the first sense pattern 120 and the second sense pattern 140 may be formed to have a predetermined pattern in such a manner that the first sense pattern 120 and the second sense pattern 140 can detect the change of capacitance when the user contacts (or touches) the touch input device 100 using his or her finger, the touch pen, or the like. In this case, the contact (or touch) may include direct contact (or direct touch) and indirect contact (or indirect touch). In other words, the direct contact may indicate that an object contacts the touch input device 100, and the indirect contact may indicate that the object does not directly contact the touch input device 100 and approaches the touch input device 100 within a specific range within which the sense patterns can detect the object.

The touch input device 100 may use both the mutual capacitance scheme and the self capacitance scheme as necessary. The self capacitance scheme may detect change of capacitance using only one electrode for each basic pixel. If multiple touch actions are not needed, the touch input device 100 may use the self capacitance scheme. The mutual capacitance scheme may detect the change of capacitance formed at an intersection point of the sense patterns formed in a grid electrode structure. Accordingly, the multiple touch actions can be applied to the touch input device 100 when using the mutual capacitance scheme.

The first sense pattern 120 may be arranged in a first direction (i.e., horizontal direction) while being divided into a predetermined number of sections in the first direction, and the second sense pattern 140 may be arranged in a different direction (i.e., vertical direction) from the first direction while being divided into a predetermined number of sections in the different direction.

The first sense pattern 120 and the second sense pattern 140 may be formed over different layers, and form an intersection unit 11. In the intersection unit 11, the first sense pattern 120 and the second sense pattern 140 may overlap with each other on the basis of an insulation unit interposed therebetween, without directly contacting each other.

The intersection unit 11 may decide resolution of the touch unit 10, and may be recognized as coordinates. That is, one case in which the input unit contacts a first intersection unit 11 and the other case in which the input unit contacts the other intersection unit 11 adjacent to the first intersection unit 11 may be distinguished from each other. In addition, it can also be recognized which intersection unit 11 contacts the intersection unit 11, such that the position of the contacted intersection unit 11 can be recognized. Therefore, as the number of intersection units 11 increases in the same-sized region, the resolution of the touch unit 10 also increases.

One end of each of the first and second sense patterns (120, 140) may be connected to the line unit 30 formed of metal lines or the like. A connection pad 40 may be provided at one end of the line unit 30, and each line unit 30 may be connected to a circuit substrate (not shown) through the connection pad 40.

A connection unit 20 may be provided at one end of the first or second sense pattern 120 or 140. Since the connection unit 20 is formed wider than each of the first and second sense patterns (120, 140), the line unit 30 is electrically and easily coupled to the first and second sense patterns (120, 140). The connection unit 20 and the line unit 30 may be bonded to each other through a conductive adhesive (e.g., solder).

The line unit 30 may transmit a sense signal of each sense pattern to the circuit substrate through the connection pad 40. The line unit 30 and the connection pad 40 may be formed of a conductive material.

If the input unit contacts one region of the touch unit 10, capacitance of the intersection unit 11 is reduced, information regarding the capacitance arrives at the circuit substrate acting as a controller through the line unit 30 and the connection pad 40, and the controller may recognize the contact position of the input unit. In addition, assuming that the input unit approaches one region of the touch unit 10, capacitance of the input unit may also be reduced. In this case, the controller may determine the approach position of the input unit.

Figure 2:
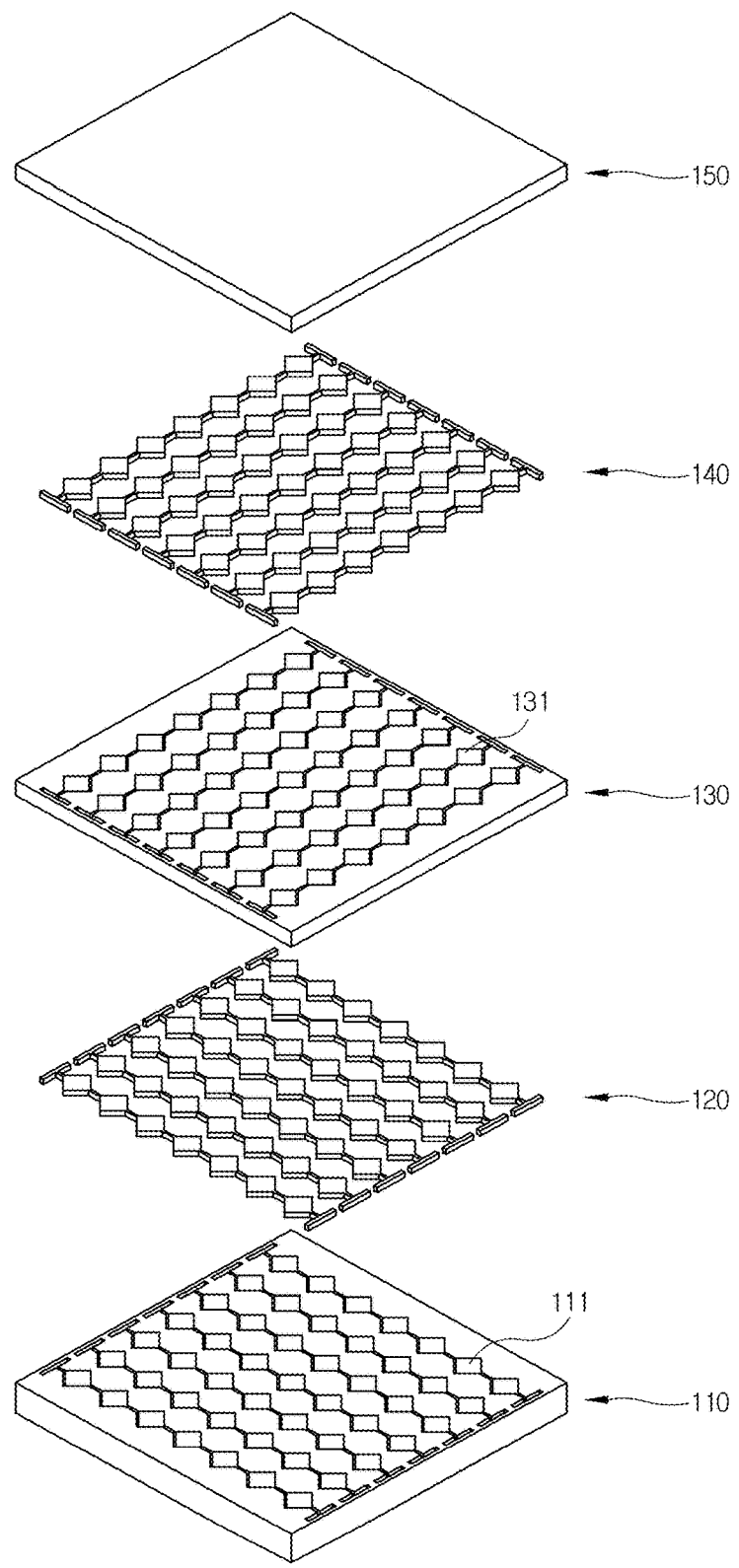
FIG. 2 is an exploded perspective view illustrating the touch input device according to a first embodiment of the present disclosure.

FIG. 2 is an exploded perspective view illustrating the touch input device 100 according to a first embodiment of the present disclosure.

Referring to FIG. 2, the touch input device 100 may include a first base 110 including a first pattern groove 111, a first sense pattern 120 plated or deposited over the first pattern groove 111, a second base 130 stacked over the first base 110 and configured to include the second pattern groove 131, a second sense pattern 140 plated or deposited over the second pattern groove 131, and an insulation layer 150 configured to insulate the second sense pattern 140.

The first sense pattern 120 and the second sense pattern 140 may be respectively formed over the first base 110 and the second base 130 according to the Laser Directing Structuring (LDS) scheme. In this case, according to the LDS scheme, a support member is formed of a nonconductive and chemically stable metal compound, some parts of the support member are exposed to UltraViolet (UV) laser or excimer laser, chemical combination of the metal compound is decomposed to expose a metal seed, and the support member is metalized such that a conductive structure is formed in the vicinity of a laser exposure part of the support member. Representative examples of the above-mentioned LDS scheme have been disclosed in Korean Patent Registration No. 374667, Korean Patent Application Publication No. 2001-40872, and Korean Patent Application Publication No. 2004-21614, the disclosures of which are incorporated herein by reference.

The first and second sense patterns (120, 140) may be formed of a conductive material, for example, metal. Specifically, the first or second sense pattern 120 or 140 may be formed of copper (Cu) from among metal materials in consideration of conductivity and economic efficiency. In addition, the first or second sense pattern 120 or 140 may also be formed of gold (Au) instead of copper (Cu) as necessary.

In addition, the plating and depositing process used as a method for forming the first sense pattern 120 and the second sense pattern 140 is well known to those skilled in the art, and as such a detailed description thereof will herein be omitted for convenience of description.

In a broad sense, the plating process may be a process for plating the surface of a target object with a thin metal layer. In this case, the plating process may conceptually include the deposition process. In a limited sense, the plating process may allow ionized metal to selectively adhere to the metal seed located at the surface in which the pattern is formed. The deposition process may allow a metal material of a plasma state to adhere to the surface in which the pattern is formed in a high-temperature vacuum state. In this case, the metal material may selectively adhere only to the pattern using the masking process. In addition, the plating process for use in the present disclosure may include a deposition-plating process corresponding to a combination of the plating process and the deposition process.

Meanwhile, the first sense pattern 120 and the second sense pattern 140 may be formed by 3D electrode patterning. For example, electrode covering may be achieved when a nozzle moves along coordinate values of the first and second sense patterns (120, 140).

The first sense pattern 120 may be extended in the first direction (i.e., the horizontal direction in the drawings), and a plurality of first sense patterns 120 may be grouped into one column as necessary. In addition, the second sense pattern 140 may be extended in the second direction (i.e., the vertical direction in the drawings) perpendicular to the first direction, and a plurality of second sense patterns 140 may be grouped into one column. However, it should be noted that a crossing angle between the first sense pattern 120 and the second sense pattern 140 is not limited to a vertical angle.

The first sense pattern 120 and the second sense pattern 140 may include successive connection of diamond-shaped patterns. However, the successive connection pattern is not limited to the diamond shape, and may include various other shapes as necessary. The neighboring diamond-shaped patterns may be interconnected by a connection unit, and the connection unit may be formed in a bridge shape configured to interconnect two patterns.

The first base 110 and the second base 130 may include a metal oxide compound. For example, the first base 110 and the second base 130 may be formed of a compound including a resin and a metal oxide. Here, the resin may include at least one of polycarbonate (PC), polyamide (PA), and acrylonitrile-butadiene-styrene copolymer (ABS), and the metal oxide may include at least one of: magnesium (Mg), chrome (Cr), copper (Cu), barium (Ba), iron (Fe), titanium (Ti), and aluminum (Al).

A first pattern groove 111 including the first sense pattern 120 therein may be formed at one surface of the first base 110, and a second pattern groove 131 including the second sense pattern 140 therein may be formed at one surface of the second base 130. That is, the first sense pattern 120 and the second sense pattern 140 may be respectively provided in the first pattern groove 111 and the second pattern groove 131.

The first pattern groove 111 may be formed by irradiating laser light to one surface of the first base 110, and the second pattern groove 131 may be formed by irradiating laser light to one surface of the second base 130. In this case, the first and second bases (110, 130) may be reduced (or deoxidized) into metal due to heat generated through groove formation, the part reduced to metal may form a metal seed in each of the first and second pattern grooves (111, 131).

The first and second sense patterns (120, 140) may be plated over the first and second pattern grooves (111, 131), respectively. This plating process over the metal seed is well known to those skilled in the art, and as such a detailed description thereof will herein be omitted for convenience of description. Alternatively, the first and second sense patterns (120, 140) may also be formed by a deposition process. Alternatively, the first and second sense patterns (120, 140) may also be formed by combining the plating process with the deposition process. For convenience of description and better understanding of the present disclosure, the following description may assume that the first and second sense patterns (120, 140) are basically formed by the plating process.

The first and second sense patterns (120, 140) may include a copper (Cu) plating layer, and may plate the copper (Cu) plating layer with nickel (Ni), such that the first and second sense patterns (120, 140) can be antioxidation-processed. In addition, assuming that gold (Au) plating is used, conductivity of the first and second sense patterns (120, 140) can be increased.

Meanwhile, the first and second bases (110, 130) may be coated over one surface of a basic (or parent) material (not shown) formed of various substances. The basic material may include resin, glass, leather, rubber, or the like. The basic material may be formed to have a stiff or elastic surface. In addition, the basic material may become hardened so that the basic material becomes rigid or flexible. The basic material may be formed by injection molding. For example, the basic material may be injection-molded so that the first or second base 110 or 130 may be formed in various shapes. In addition, the first and second bases (110, 130), each of which includes a metal oxide material, may be coated over the top or bottom surface of the basic material.

The insulation layer 150 may be stacked over one surface of the second base 130 so as to insulate the second sense pattern 140. Alternatively, the insulation layer 150 may be omitted as necessary.

In accordance with one embodiment of the present disclosure, the touch input device 100 may allow one surface (i.e., the top surface of FIG. 2) of the insulation layer 150 to be used as a touch surface. For example, the second base 130 and the second sense pattern 140 may be arranged at the other surface of the insulation layer 150.

In this case, the insulation layer 150 may be used as a coating layer. The insulation layer 150 may prevent the second sense pattern 140 from being exposed to the outside such that interference caused by pollutants or contaminants can be prevented. The insulation layer 150 may be formed of a transparent or non-transparent material. For example, the insulation layer 150 may be UltraViolet(UV)-coated.

Alternatively, the insulation layer 150 may be formed of resin, glass, or the like. In addition, the insulation layer 150 may also be formed of leather, rubber, or the like. The insulation layer 150 may be formed of an injection-molded material. For example, the insulation layer 150 may be formed by injection of a resin including PC (Polycarbonate), PA (Polyamide), and ABS (acrylonitrile-butadiene-styrene copolymer).

In addition, according to another embodiment, the touch input device 100 may allow the other surface (i.e., the bottom surface of FIG. 2) of the first base 110 to be used as a touch surface. For example, the first sense pattern 120 and the second base 130 may be provided at one surface of the first base 110, and the back surface of the first base 110 may be provided as a touch surface. In this case, the downward direction shown in FIG. 2 may be a direction along which the touch action is achieved.

Figure 3:
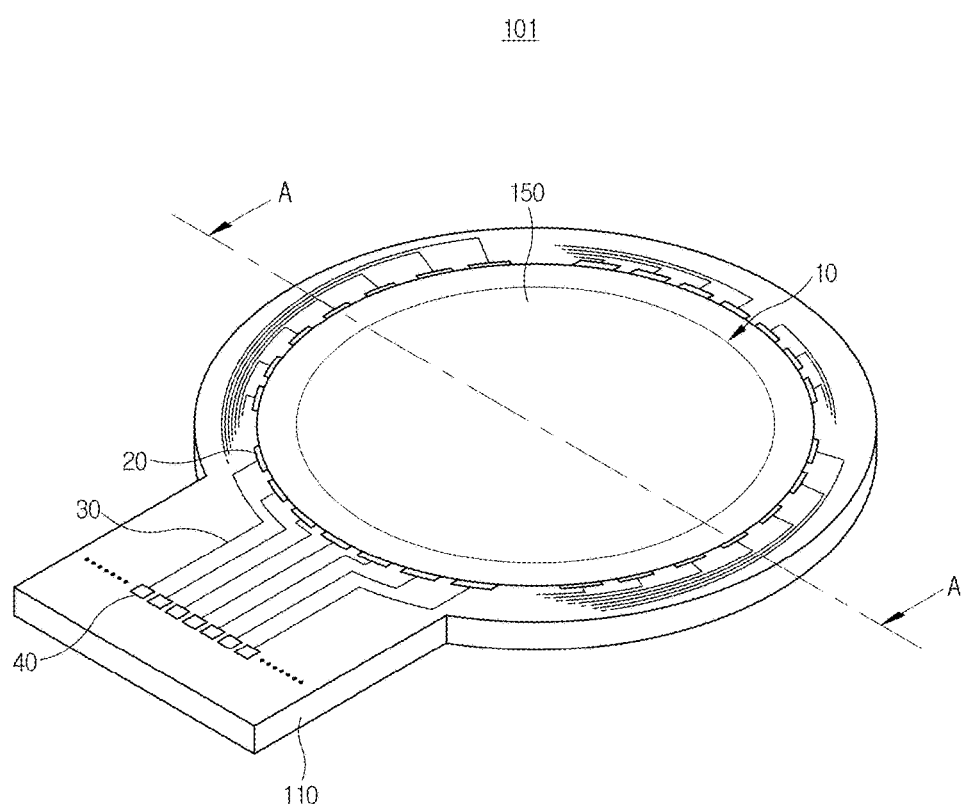
FIG. 3 is a perspective view illustrating the touch input device in which a touch unit is formed to have a curved surface according to a first embodiment of the present disclosure.
Figure 4:
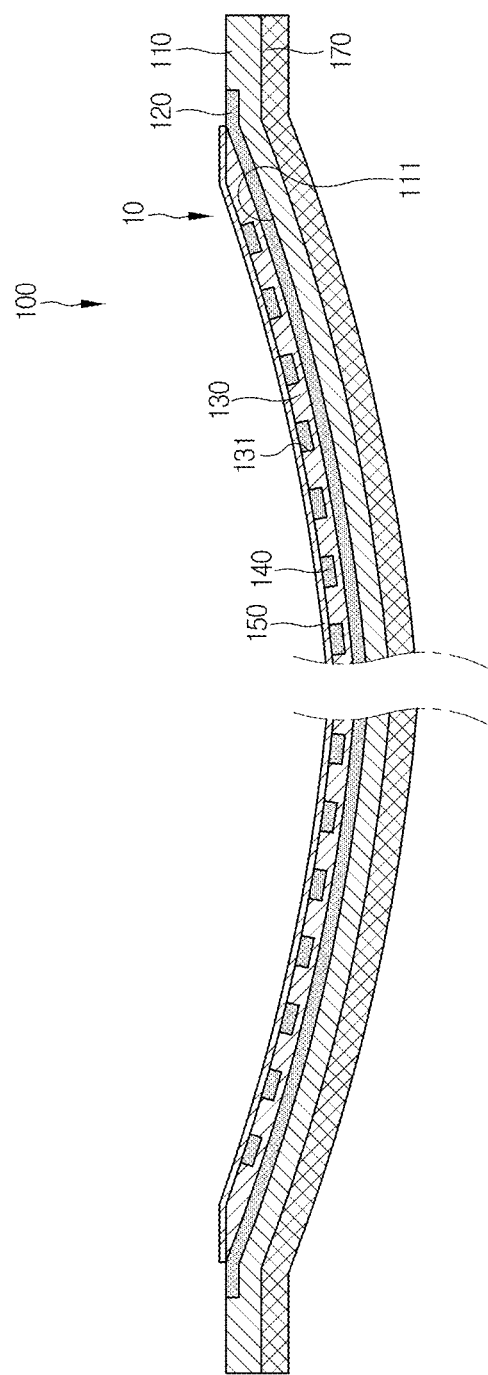
FIG. 4 is a cross-sectional view illustrating the touch input device taken along the line A-A shown in FIG. 3.

FIG. 3 is a perspective view illustrating the touch input device 100 in which the touch unit 10 is formed to have a curved surface according to a first embodiment of the present disclosure. FIG. 4 is a cross-sectional view illustrating the touch input device taken along the line A-A shown in FIG. 3.

As shown in FIGS. 3 and 4, the touch input device 100 according to the first embodiment may include the touch unit 10 formed in a curved shape. The first and second sense patterns (120, 140) may be curved along a curvature of the touch (or contact) surface.

The curved surface of the touch unit 10 may include a curved surface having a constant curvature and the other curved surface having a changing curvature. In addition, the curved surface of the touch unit 10 may include a curved surface including two or more curvatures and the other curved surface, the curved (or bent) direction of which is changed according to coordinates. In addition, the touch unit 10 may have a broken-lined (or sharp-edged) surface. For example, the touch unit 10 may also be formed by concatenation of edges (or corners).

The first base 110 may be coated over one surface of the basic material 170. The basic material 170 may be formed of resin, glass, or the like. In addition, the basic material 170 may also be formed of leather, rubber, or the like. The basic material 170 may be formed of an injection-molded material. For example, the basic material 170 may be formed by injection of a resin including PC (Polycarbonate), PA (Polyamide), and ABS (acrylonitrile-butadiene-styrene copolymer).

The first base 110 may include a curved surface at one end thereof. For example, one surface of the first base 110 may have some parts of a spherical surface. The first pattern groove 111 may be formed over the curved surface of the first base 110. In this case, since the first pattern groove 111 is formed by laser light, the first pattern groove 111 having a complicated shape may be formed irrespective of the shape of the first base 110.

The first sense pattern 120 may be plated over the first pattern groove 111. In this case, the first sense pattern 120 may be plated irrespective of the shape of the first pattern groove 111 according to characteristics of the plating process. The first sense pattern 120 can be easily plated over the first pattern groove 111 even when the first pattern groove 111 is not formed in a straight or planar shape.

The second base 130 may be formed to a predetermined thickness over the first base 110. Therefore, a curved shape corresponding to curvature of the first base 110 may be formed over one surface of the second base 130. The second pattern groove 131 may be formed over the curved surface of the second base 130. In this case, since the second pattern groove 131 is formed by laser light, the second pattern groove 131 having a complicated shape may be formed irrespective of the shape of the second base 130.

The second sense pattern 140 may be plated over the second pattern groove 131. In this case, the first sense pattern 140 may be plated irrespective of the shape of the second pattern groove 131 according to characteristics of the plating process. The second sense pattern 140 can be easily plated over the second pattern groove 131 even when the second pattern groove 131 is not formed in a straight or planar shape.

In addition, a connection unit connected to the line unit 30 may be located at one side of the first or second sense pattern 120 or 140. The connection unit may be electrically coupled to each sense pattern, and may be formed wider than each sense pattern 120 or 140. In addition, the connection unit may be soldered to the line unit 30 such that the connection unit can be electrically coupled to the line unit 30.

Alternatively, i.e., different from the drawings, the first and second sense patterns (120, 140) may be incorporated with the line unit 30. That is, although the first and second sense patterns (120, 140) are provided only in the touch unit 10, it should be noted that each sense pattern may be extended to the external region of the touch unit 10 so that it can be directly coupled to the connection pad 40 without departing from the scope or spirit of the present disclosure.

The first base 110 or the second base 130 may be formed to extend to a region in which the line unit 30 is provided. For example, the first sense pattern 120 and the line unit 30 may be formed over the first base 110, the second base 130 may be deposited over the first base 110 to cover the first sense pattern 120, the second sense pattern 140 may be formed over the second base 130, and the second sense pattern may be connected to the line unit 30.

Finally, the insulation layer 150 for preventing the second sense pattern 140 from being exposed to the outside may be coated. One surface of the insulation layer 150 may be used as the touch unit 10.

Figure 5:
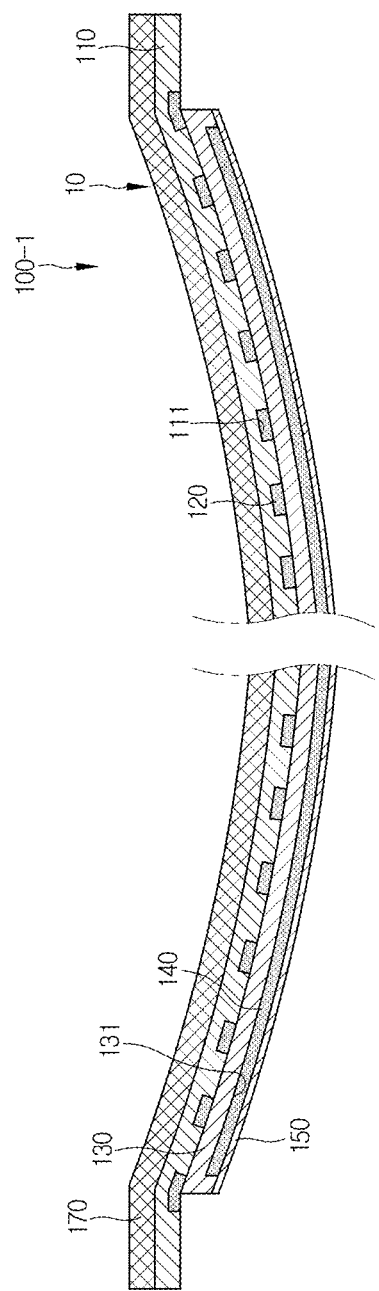
FIG. 5 is a cross-sectional view illustrating another example of the touch input device shown in FIG. 4.

FIG. 5 is a cross-sectional view illustrating another example 100-1 of the touch input device shown in FIG. 4.

Referring to FIG. 5, one surface of the basic material 170 may be used as the touch unit 10. The first base 110 may be coated over the bottom surface of the basic material 170. The following description is identical to those of FIG. 4.

A method for manufacturing the touch input device 100 according to the first embodiment will hereinafter be described with reference to FIGS. 6 to 13.

Figure 6:
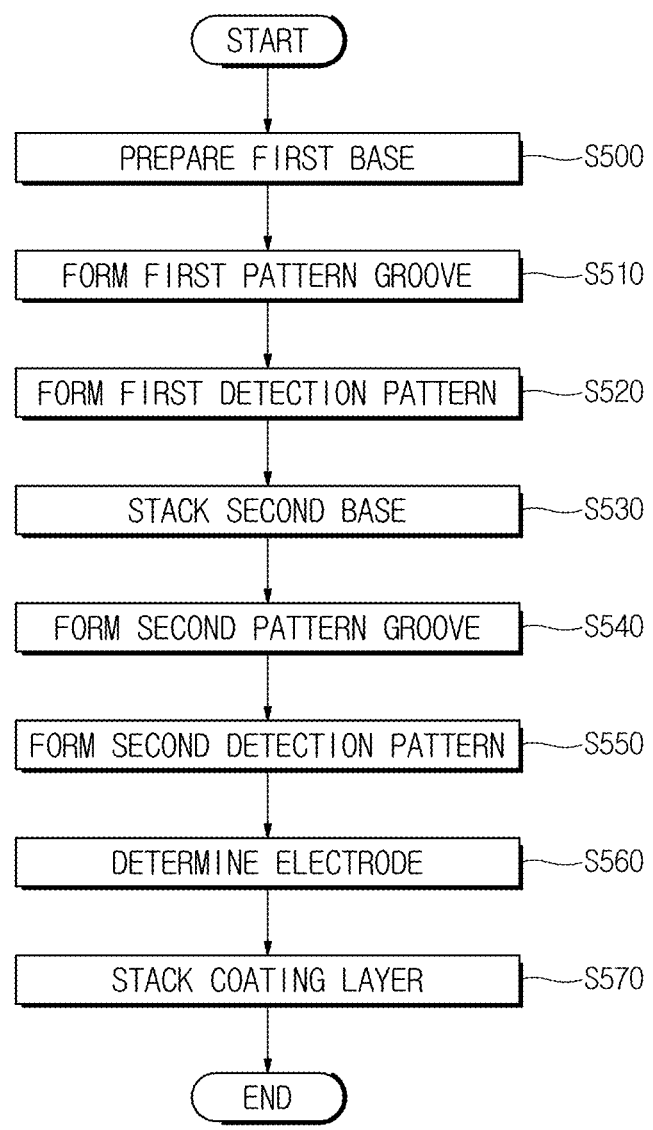
FIG. 6 is a flowchart illustrating a method for manufacturing the touch input device according to a first embodiment of the present disclosure.

FIG. 6 is a flowchart illustrating a method for manufacturing the touch input device 100 according to a first embodiment of the present disclosure. FIGS. 7 to 13 illustrate methods for manufacturing the touch input device 100 according to a first embodiment of the present disclosure.

Figure 7:
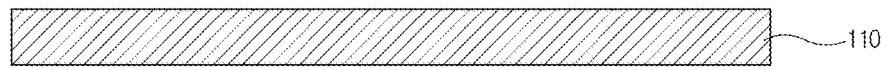
FIGS. 7 to 13 illustrate methods for manufacturing the touch input device according to a first embodiment of the present disclosure.

FIG. 7 is a conceptual diagram illustrating an operation S510 for preparing a first base 110.

The first base 110 may include a metal oxide compound. For example, the first base 110 may be a compound including a resin and a metal oxide. Here, the resin may include at least one of: PC (Polycarbonate), PA (Polyamide), and ABS (acrylonitrile-butadiene-styrene copolymer), and the metal oxide may include at least one of magnesium (Mg), chrome (Cr), copper (Cu), barium (Ba), iron (Fe), titanium (Ti), and aluminum (Al).

The first base 110 may be coated over the basic material (not shown). For example, the first base 110 may be formed by coating the first base 110 including a metal compound over one surface (formed of another material, for example, resin, glass, leather, or the like) of the basic material as necessary. The basic material may have a thickness of 1 mm to 1.5 mm, and the first base 110 may be coated to a thickness of several micrometers (μm) to several tens of micrometers (μm). However, the basic material and the first base 110 may be formed to have various thicknesses as necessary.

Alternatively, the first base may be incorporated with the basic material. For example, the first base 110 may be formed by injection molding.

Differently from the drawings, one surface of the first base 110 may be curved. For example, one surface of the first base 110 may have a recessed curvature as some parts of a spherical surface.

Figure 8:

FIG. 8 is a conceptual diagram illustrating an operation S510 for fabricating a first pattern groove 111.

As shown in FIG. 8, the first pattern groove 111 may be formed by irradiating laser light (e.g., UV laser or excimer laser) to one surface of the first base 110. In this case, heat generated by groove formation may decompose chemical combination of the metal compound so that the metal compound is reduced into metal, resulting in formation of a metal seed in the first pattern groove 111.

The first pattern groove 111 may be formed over one surface of the first base having a curved surface. Since each groove is formed by laser irradiation, it may be possible to form various shapes of patterns irrespective of the surface shape of the first base 110.

Figure 9:

FIG. 9 is a conceptual diagram illustrating an operation S520 for forming a first sense pattern 120.

As shown in FIG. 9, the first sense pattern 120 may be formed by metalizing the first pattern groove 111 in which the metal seed is exposed. For example, the first sense pattern 120 may include copper (Cu) plated over the first pattern groove 111. In addition, nickel (Ni) may be plated over the copper (Cu) plating film so as to perform anti-oxidation processing.

Figure 10:
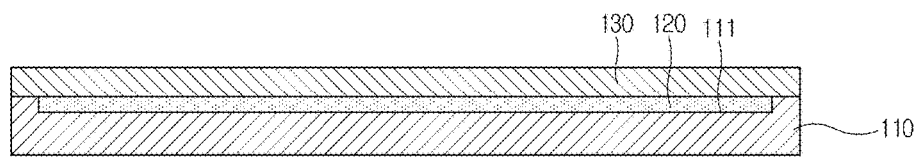
Figure 11:
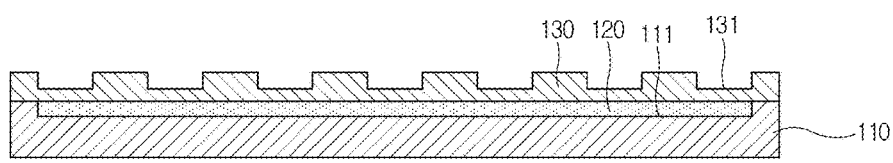
Figure 12:
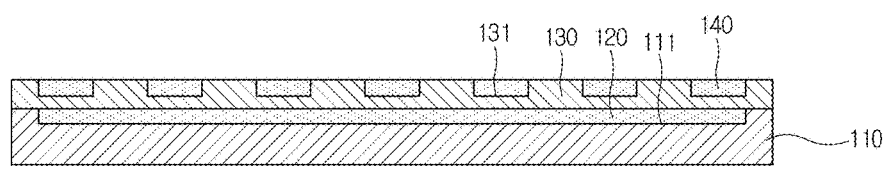

FIG. 10 is a conceptual diagram illustrating an operation S530 for stacking a second base 130. FIG. 11 is a conceptual diagram illustrating an operation S540 for fabricating a second pattern groove 131. FIG. 12 is a conceptual diagram illustrating an operation S550 for forming a second sense pattern 140.

The second base 130 may be formed of a metal compound, and may be coated over the first base 110. The second base 130 may be coated to a thickness of several micrometers (μm) to several tens of micrometers (μm). However, the second base 130 may be formed to have various thicknesses as necessary.

Additionally, the fabrication processes shown in FIGS. 10 to 12 are identical to those of FIGS. 7 to 9, and as such a detailed description thereof will herein be omitted for convenience of description.

Meanwhile, after formation of the second base 130, the process for investigating whether the second base 130 has a constant thickness may further be used. In order to measure the thickness of the second base 130, laser light, ultrasound, optical elements, and impedance elements may be used.

The process for investigating whether the second base 130 has a constant thickness is a process for investigating whether a distance between the first sense pattern 120 and the second sense pattern 140 is constant or is within the error range, and this process is needed to guarantee a touch performance and productivity.

If the second base 130 has an irregular thickness, the distance between the first sense pattern 120 and the second sense pattern 140 becomes irregular, such that touch sensitivity may be changed according to coordinates.

Figure 13:
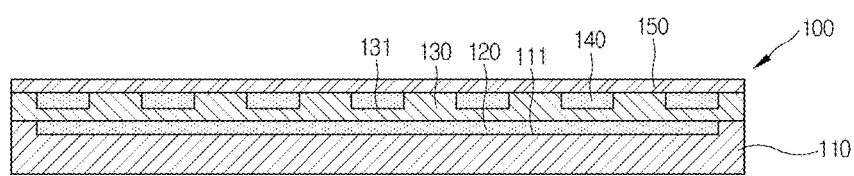

FIG. 13 is a conceptual diagram illustrating an operation S570 for stacking an insulation layer 150.

As shown in FIG. 13, the insulation layer 150 may be coated over the second base 130 so as to protect the second sense pattern 140 from external impact or pollutants (i.e., contaminants).

Meanwhile, as shown in FIG. 4, the insulation layer 150 may construct a touch surface of the touch unit 10. Alternatively, as shown in FIG. 5, the other surface of the first base 110 may construct a touch surface of the touch unit 10.

Although not shown in the drawings, the method for manufacturing the touch input device may further include an investigation operation S560 for determining whether the touch input device 100 formed by fabrication processes of FIGS. 7 to 13 normally operates.

The investigation operation S560 may include providing a current to the first and second sense patterns (120, 140); and detecting the change of mutual capacitance between two sense patterns to determine whether the two sense patterns can be used as a sensor. In order to allow the touch input device 100 to function as a satisfactory product, if mutual capacitance between the first and second sense patterns (120, 140) is changed when the input unit contacts the touch unit 10, the changed capacitance needs to be detected in a manner that the contact (or touch) position of the input unit can be recognized.

In the meantime, the investigation operation S560 may be performed prior to the stacking operation S570 of the insulation layer 150. Because consensus is not obtained in the investigation operation S560 and the second sense pattern 140 may be received in the investigation operation S560, the investigation operation S560 may be carried out prior to execution of the stacking operation S570 of the insulation layer 150.

Figure 14:
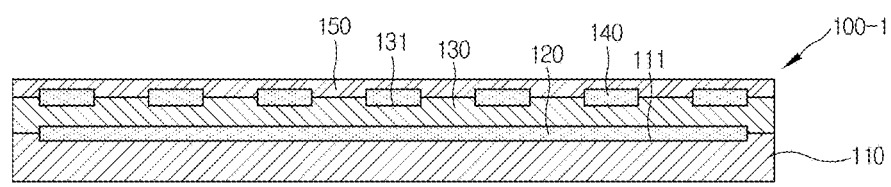
FIG. 14 is a cross-sectional view illustrating a modified example of the touch input device according to the first embodiment of the present disclosure.

FIG. 14 is a cross-sectional view illustrating a modified example 100-1 of the touch input device according to the first embodiment of the present disclosure.

As shown in to the modified example 100-1 of the touch input device according to the first embodiment, some parts of a lower part of the first sense pattern 120 may be included in a first pattern groove 111 of the first base 110, and some parts of an upper part of the first sense pattern 120 may be included in a lower part of the second base 130.

Some parts of the lower part of the second sense pattern 140 may be included in a second pattern groove 131 of the second base 130, and some parts of the upper part of the second sense pattern 140 may be included in a lower part of the insulation layer 150.

For example, a half of the first sense pattern 120 may be included in the first pattern groove 111 of the first base 110, and the remaining half of the first sense pattern 120 may be included in the lower part of the second base 130.

In the meantime, if the first or second sense pattern 120 or 140 protrudes from the top surface of the first or second base 110 or 130, this situation may be associated with the first or second sense pattern 120 or 140 formed by LDS processing. If the first or second sense pattern 120 or 140 is formed in the first or second pattern groove 111 or 131 engraved with laser on one surface of the first or second base 110 or 130 using the plating or deposition process, the lower part of the first or second sense pattern 120 or 140 may be accommodated in the first or second pattern groove 111 or 131 and the upper part of the first or second sense pattern 120 or 140 may protrude from the first or second pattern groove 111 or 131. That is, a separate planarization (e.g., CMP) process is needed in a manner that one surface of the first or second sense pattern 120 or 140 can achieve the same plane as one surface of the first or second base 110 or 130.

Touch sensitivity of the touch input device 100-1 may be changed according to the distance between the first sense pattern 120 and the second sense pattern 140. The distance between the first sense pattern 120 and the second sense pattern 140 is constant in all the touch regions, such that constant touch sensitivity can be achieved in the whole touch region.

The distance between the first sense pattern 120 and the second sense pattern 140 may be changed according to a stacked thickness of the second base 130. The width and depth of each of the first pattern groove 111 and the second pattern groove 131 may be maintained constant according to characteristics of laser processing. Thickness of the first sense pattern 120 and the second sense pattern 140 may also be maintained constant according to characteristics of the plating or deposition process.

In addition, the method for manufacturing the modified example 100-1 of the touch input device according to the first embodiment may further include investigating whether the second base 130 has a constant thickness before the second base 103 is stacked and the second pattern groove 131 is formed. In this case, it may be possible to investigate whether a constant thickness is achieved in the overall region of the second base 130. If necessary, it may also be possible to investigate whether a constant thickness is achieved only in the remaining region other than the outer wall of the second base 130. Through the above-mentioned process for investigating the thickness of the second base 130, touch performance and productivity (or production yield) can be guaranteed.

The process for investigating the thickness of the second base 130 may include determining whether the distance between the first sense pattern 120 and the second sense pattern 140 is constant in the overall region, or determining whether the distance between the first sense pattern 120 and the second sense pattern 140 is in the error range.

Meanwhile, differently from the drawings, the second base 130 may be formed to have a curved surface or a sharply broken surface, instead of having a plane. Even when the second base is formed to have a curved surface or a broken surface, the thickness of the second base 130 may be measured in the same manner as in the above example. Each of the first sense pattern 120 and the second sense pattern 140 may be configured in a rectangular parallelepiped shape, or in a bar shape, a cross-sectional view of which is a rectangle shape. In more detail, the width and thickness of a cross-sectional view of the rectangle may be 100 μm and 20 μm, respectively.

Each of first pattern groove 111 and the second pattern groove 131 may have a width of 100 μm and a depth of 10 μm. Therefore, a lower half part of the first sense pattern 120 may be inserted into the first pattern groove 111, and an upper half part of the first sense pattern 120 may protrude from the first base 110 by a thickness of 10 μm. The lower half part of the second sense pattern 140 may be inserted into the second pattern groove 131, and the upper half part of the second sense pattern 140 may protrude from the second base 130 by a thickness of 10 μm.

The second sense pattern 140 needs to be located within an effective distance from the first sense pattern 120. If the second sense pattern 140 deviates from the effective distance from the first sense pattern 120, touch sensitivity is deteriorated so that it may be difficult to actually use the second sense pattern 140 for commercial purposes. In this case, the effective distance between the first sense pattern 120 and the second sense pattern 140 may be changed according to thickness of the first base 110, because the potential change between the user input unit and the sense patterns (120, 140) is gradually reduced in proportion to the increasing thickness of the first base 110.

The following Table 1 illustrates capacitance changed according to the thickness of the second base 130 when the first base 110 has a thickness of 1 mm and the user conducts the touch action using his or her finger. As can be seen from the following Table 1, all experimental values are not displayed, and only representative values are extracted and displayed.

TABLE 1

| Thickness of Second Base (μm) | Distance between first and second sense patterns (μm) | Capacitance (fF) |
|---|---|---|
| 30 | 10 | −4.096 |
| 40 | 20 | −4.004 |
| 100 | 80 | −3.613 |
| 400 | 380 | −2.839 |
| 1000 | 980 | −2.241 |
| 1300 | 1280 | −2.026 |
| 1340 | 1320 | −2.001 |
| 1350 | 1330 | −1.993 |
| 1350 | 1330 | −1.9933 |

In Table 1, assuming that the second base 130 has a thickness of 1300 μm, the actual distance between the first sense pattern 120 and the second sense pattern 140 may be 1280 μm, and the measured capacitance may be −2.026 f F.

Assuming that the second base 130 has a thickness of 1340 μm, the actual distance between the first sense pattern 120 and the second sense pattern 140 may be 1320 μm, and the measured capacitance may be −2.001 f F.

Assuming that the second base 130 has a thickness of 1350 μm, the actual distance between the first sense pattern 120 and the second sense pattern 140 may be 1330 μm, and the measured capacitance may be −1.993 f F.

Therefore, it is expected that the second base 130 has a thickness of 1340 to 1350 μm and the measured capacitance may be −2.000 fF. However, because of the presence of technical issues, the second base 130 is generally formed to have a thickness of 10 μm in a manufacturing process.

Generally, in order to implement commercial availability for a touchpad, it is necessary for the measured capacitance to be less than −2.000 fF (femto Farad). In this case, the thickness of the second base 130 needs to be less than 1350 μm.

The thickness of the second base 130 needs to be larger than 20 μm. If the thickness of the second base 130 is equal to or less than 20 μm, the first sense pattern 120 contacts the second sense pattern 140 so that capacitance is not generated, because the first sense pattern 120 is formed to protrude from the bottom surface of the second base 130 by a thickness of 10 μm and the second sense pattern 140 may be recessed from the top surface to the bottom surface of the second base 130 by a predetermined thickness of 10 μm.

Therefore, assuming that the first base 110 has a thickness of 1 mm, the thickness of the second base 130 must be larger than 20 μm or must be less than 1350 μm.

The following Table 2 illustrates capacitance changed according to the thickness of the second base 130 when the first base 110 has a thickness of 1.5 mm and the user conducts the touch action using his or her finger. As can be seen from the following Table 2, all experimental values are not displayed, and only representative values are extracted and displayed.

TABLE 2

| Thickness of Second Base (μm) | Distance between first and second sense patterns (μm) | Capacitance (fF) |
|---|---|---|
| 30 | 10 | −2.164 |
| 40 | 20 | −2.149 |
| 60 | 40 | −2.167 |
| 80 | 60 | −2.955 |
| 100 | 80 | −2.095 |
| 120 | 100 | −2.059 |
| 130 | 110 | −2.056 |
| 140 | 120 | −1.999 |
| 150 | 130 | −1.964 |

In Table 2, assuming that the second base 130 has a thickness of 130 μm, the actual distance between the first sense pattern 120 and the second sense pattern 140 may be 110 μm, and the measured capacitance may be −2.026 fF.

Assuming that the second base 130 has a thickness of 140 μm, the actual distance between the first sense pattern 120 and the second sense pattern 140 may be a120 μm, and the measured capacitance may be −1.999 fF.

Assuming that the second base 130 has a thickness of 150 μm, the actual distance between the first sense pattern 120 and the second sense pattern 140 may be 130 μm, and the measured capacitance may be −1.964 f F.

Generally, in order to implement commercial availability for a touchpad, it is necessary for the measured capacitance to be less than −2.000 fF (femto Farad). In this case, the thickness of the second base 130 needs to be less than 140 μm.

The thickness of the second base 130 needs to be larger than 20 μm. If the thickness of the second base 130 is equal to or less than 20 μm, the first sense pattern 120 contacts the second sense pattern 140 so that capacitance is not generated, because the first sense pattern 120 is formed to protrude upward from the bottom surface of the second base 130 by a thickness of 10 μm and the second sense pattern 140 may be recessed downward from the top surface of the second base 130 by a predetermined thickness of 10 μm.

Therefore, assuming that the first base 110 has a thickness of 1.5 mm, the thickness of the second base 130 must be larger than 20 μm and must be less than 140 μm.

Meanwhile, a maximum thickness of the second base 130 is linearly reduced in proportion to the increasing thickness of the first base 110, such that a maximum allowable thickness Y (μm) of the second base 140 when the first base 110 has a thickness of X mm can be recognized.

$$Y\ \mu m = -1200\ \mu m * 2(X\ mm - 1.0\ mm)/1\ mm + 1350\ \mu m$$

In other words, assuming that the first base 110 has a thickness of X mm, the thickness of the second base 130 must be larger than 20 μm and must be less than Y μm.

In addition, the range of a thickness (X) of the first base 110 may be denoted by 0 mm<X<1.55 mm. A minimum thickness of the first base may be determined to be larger than the depth of a recessed part of the first sense pattern 120. For example, assuming that the first sense patter 120 is recessed from the top surface to the bottom surface of the first base 110 by a thickness of 10 μm, a minimum thickness of the first base 110 must be larger than 10 μm.

A maximum thickness of the first base 110 may be determined using the condition indicating that a maximum allowable thickness of the second base 140 is larger than 20 μm. If the first base 110 has a thickness (X) of 1.55 mm, a maximum allowable thickness (Y) of the second base 130 may be 19 μm according to the above-mentioned equation.

The above-mentioned example has disclosed that the second base 130 has a thickness of 20 μm or greater. Accordingly, the thickness (X) of the first base 110 must be less than 1.55 mm.

Figure 15:
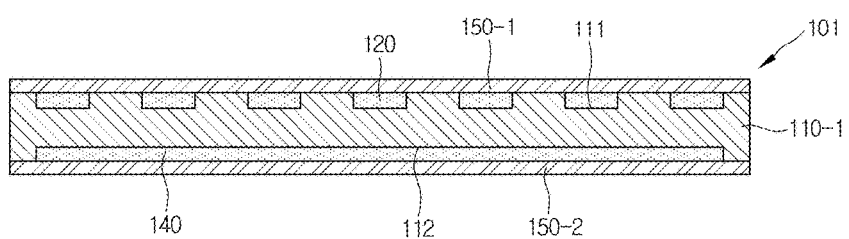
FIG. 15 is a cross-sectional view illustrating a touch input device according to a second embodiment of the present disclosure.

FIG. 15 is a cross-sectional view illustrating a touch input device 101 according to a second embodiment of the present disclosure.

As shown in FIG. 15, the touch input device 102 according to the second embodiment may include a base 110-1; a first pattern groove 111 formed over one surface of the base 110-1; a second pattern groove 112 formed over a back surface of the base 110-1; a first sense pattern 120 plated or deposited over the first pattern groove 111; a second sense pattern 140 plated or deposited over the second pattern groove 112; a first insulation layer 150-1 coated over one surface of the base 110-1; and a second insulation layer 150-2 coated over the other surface of the base 110-1. In this case, at least one of the first insulation layer 150-1 and the second insulation layer 150-2 may be omitted as necessary.

The touch input device 101 according to the second embodiment may form the first sense pattern 120 and the second sense pattern 140 over both surfaces of the base, respectively. That is, since only one base 110-1 is used to form a double-layered sense pattern, the touch input device 100 becomes thinner in thickness, resulting in implementation of a slim product design.

Figure 16:
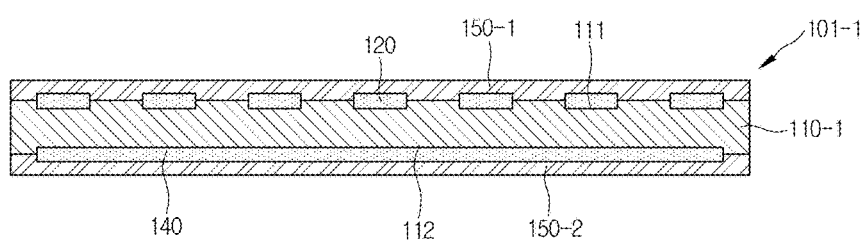
FIG. 16 is a cross-sectional view illustrating a modified example of the touch input device according to the second embodiment of the present disclosure.

FIG. 16 is a cross-sectional view illustrating a modified example 101-1 of the touch input device according to the second embodiment of the present disclosure.

As shown the modified example 101-1 of the touch input device according to the second embodiment, some parts of a lower part of the first sense pattern 120 may be included in the first pattern groove 111 of the base 110-1, and some parts of an upper part of the first sense pattern 120 may protrude from the top surface of the base 110-1.

Some parts of the upper part of the second sense pattern 140 may be included in the second pattern groove 112 of the base 110-1, and some parts of the lower part of the second sense pattern 140 may protrude from the bottom surface of the base 110-1.

For example, a half of the first sense pattern 120 may be included in the first pattern groove 111 of the base 110-1, and the remaining half of the first sense pattern 120 may protrude from the top surface of the base 110-1. A half of the second sense pattern 140 may be included in the second pattern groove 112 of the base 110-1, and the remaining half of the second sense pattern 140 may protrude from the bottom surface of the base 110-1.

In the meantime, if the first or second sense pattern 120 or 140 protrudes from the top or bottom surface of the base 110-1, this situation may be associated with the first or second sense pattern 120 or 140 formed by LDS processing. If the first or second sense pattern 120 or 140 is formed in the first or second pattern groove 111 or 112 engraved with laser light on both surfaces of the base 110-1 using the plating or deposition process, some parts of the first or second sense pattern 120 or 140 may be accommodated in the first or second pattern groove 111 or 112, and the remaining parts of the first or second sense pattern 120 or 140 may protrude from the first or second pattern groove 111 or 112. That is, a separate planarization (e.g., CMP) process is needed in a manner that one surface of the first or second sense pattern 120 or 140 can achieve the same plane as one surface of the base 110-1.

Figure 17:
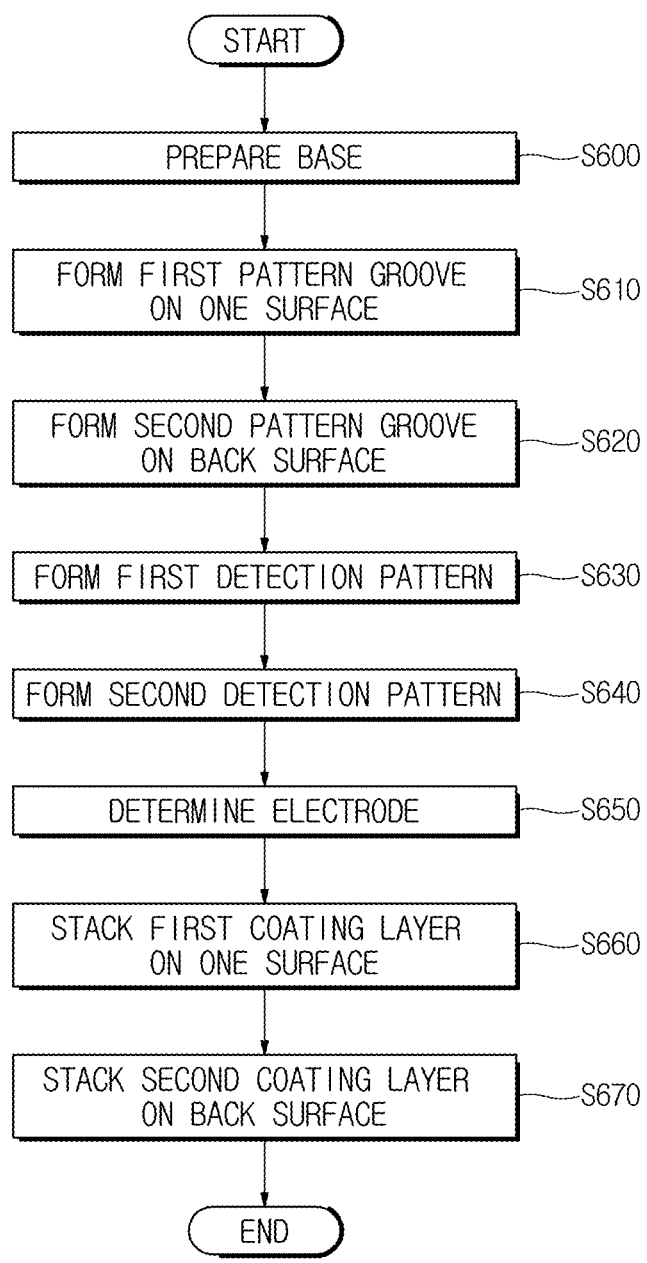
FIG. 17 is a flowchart illustrating a method for manufacturing the touch input device according to a second embodiment of the present disclosure.

FIG. 17 is a flowchart illustrating a method for manufacturing the touch input device 101 according to a second embodiment of the present disclosure.

As shown in FIG. 16, the method for manufacturing the touch input device 101 according to the second embodiment may include: preparing for (S600) the base 110-1; fabricating (S610) the first pattern groove 111 over one surface of the base 110-1; fabricating (S620) the second pattern groove 112 over the back surface of the base 110-1 by turning over the base 110-1; forming (S630) the first sense pattern 120 by plating or depositing over the first sense pattern 120 over the first pattern groove 111; forming (S640) the second sense pattern 140 by plating or depositing the second sense pattern 140 over the second pattern groove 112; stacking (S660) the first insulation layer 150-1 over one surface of the base 110-1 so as to protect the first sense pattern 120; and stacking (S670) the second insulation layer 150-2 over the other surface of the base 110-1 so as to protect the second sense pattern 140.

Alternatively, the fabrication operation S610 for fabricating the first pattern groove 111 over one surface of the base 110-1 and the other fabrication operation S620 for fabricating the second pattern groove over the back surface of the base 110-1 may be simultaneously or successively carried out. In addition, the plating or deposition operation S630 of the first sense pattern 120 and the plating or deposition process S640 of the second sense pattern 140 may also be simultaneously or successively carried out.

In addition, the investigation operation S650 for determining whether the first sense pattern 120 and the second sense pattern 140 are normally operated may be carried out prior to the stacking operations (S660, S670) of the first and second coating layers 150.

Figure 18:
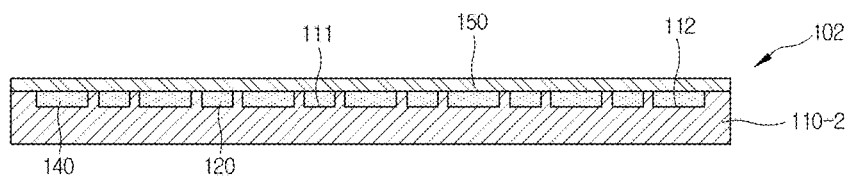
FIG. 18 is a cross-sectional view illustrating a touch input device according to a third embodiment of the present disclosure.

FIG. 18 is a cross-sectional view illustrating a touch input device 102 according to a third embodiment of the present disclosure.

As shown in FIG. 18, the touch input device 102 according to the third embodiment may include: a base 110-2; first and second pattern grooves (111, 112) formed over one surface of the base 110-2; a first sense pattern 120 plated over the first pattern groove 111; a second sense pattern 140 plated over the second pattern groove 112; and an insulation layer 150 coated over one surface of the base 110-2.

The touch input device 102 according to the third embodiment may form the first sense pattern 120 and the second sense pattern 140 over one surface of the base 110-2. That is, since only one base 110-2 is used to form a double-layered sense pattern, the touch input device 103 becomes thinner in thickness, resulting in implementation of a slim product design.

The first sense pattern 120 and the second sense pattern 140 are not connected to each other and may be spaced apart from each other by a predetermined distance. The first sense pattern 120 and the second sense pattern 140 may be formed not to cross each other. Each pattern may be formed in various shapes. For example, United States Patent Publication No. 2015-0234492 discloses a plurality of patterns formed over only one surface.

Figure 19:
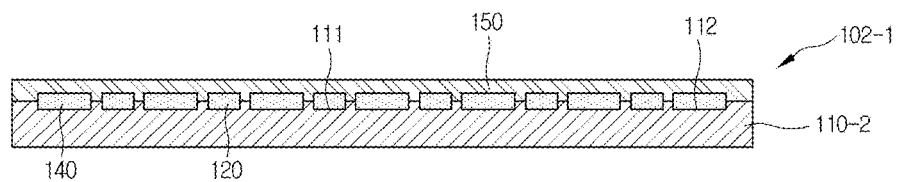
FIG. 19 is a cross-sectional view illustrating a modified example of the touch input device according to the third embodiment of the present disclosure.

FIG. 19 is a cross-sectional view illustrating a modified example 102-1 of the touch input device according to the third embodiment of the present disclosure.

As shown in the modified example 102-1 of the touch input device according to the third embodiment, some parts of a lower part of the first or second sense pattern 120 or 140 may be included in the first or second pattern groove 111 or 112 of the base 110-2, and some parts of an upper part of the first or second sense pattern 120 or 140 may protrude from the top surface of the base 110-2.

For example, a half of the first or second sense pattern 120 or 140 may be included in the first or second pattern groove 111 or 112 of the base 110-2, and the remaining half of the first or second sense pattern 120 or 140 may protrude from the top surface of the base 110-2.

Figure 20:
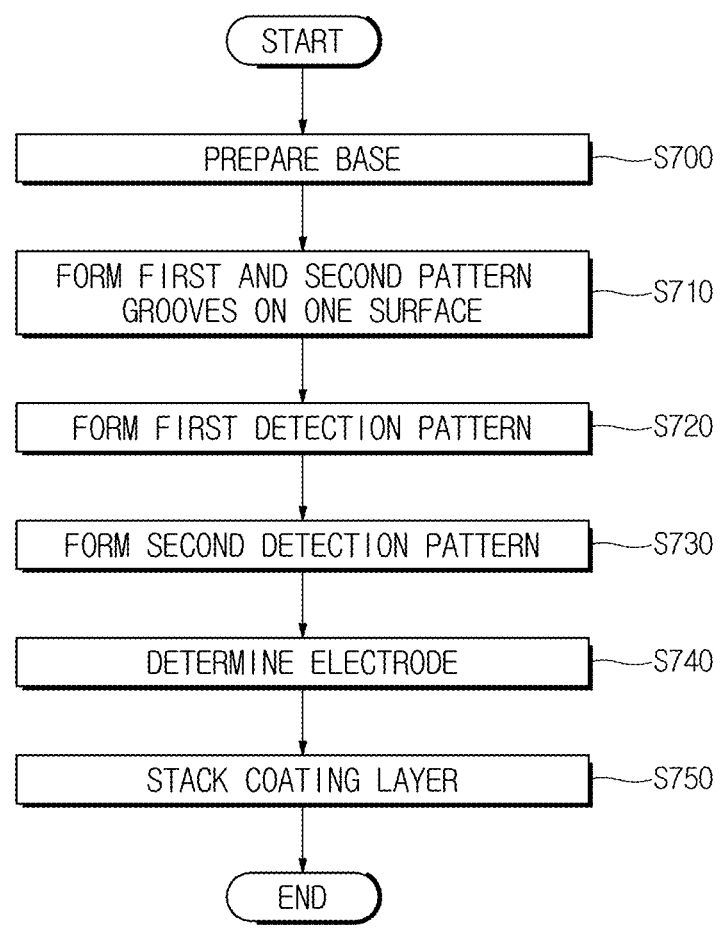
FIG. 20 is a flowchart illustrating a method for manufacturing the touch input device according to a third embodiment of the present disclosure.

In the meantime, if the first or second sense pattern 120 or 140 protrudes from the top surface of the base 110-2, this situation may be associated with the first or second sense pattern 120 or 140 formed by LDS processing. If the first or second sense pattern 120 or 140 is formed in the first or second pattern groove 111 or 112 engraved with laser light on one surface of the base 110-2 using the plating or deposition process, some parts of the first or second sense pattern 120 or 140 may be accommodated in the first or second pattern groove 111 or 112, and the remaining parts of the first or second sense pattern 120 or 140 may protrude from the first or second pattern groove 111 or 112. That is, a separate planarization (e.g., CMP) process is needed in a manner that one surface of the first or second sense pattern 120 or 140 can achieve the same plane as one surface of the base 110-2. FIG. 20 is a flowchart illustrating a method for manufacturing the touch input device 102 according to a third embodiment of the present disclosure.

As shown in FIG. 20, the method for manufacturing the touch input device 102 according to the third embodiment may include: preparing for (S700) the base 110-2; fabricating (S710) the first pattern groove 111 and the second pattern groove 112 over one surface of the base 110-2; forming (S720) the first sense pattern 120 by plating or depositing the first sense pattern 120 over the first pattern groove 111; forming (S730) the second sense pattern 140 by plating or depositing the second sense pattern 140 over the second pattern groove 112; and stacking (S750) the insulation layer 150 over one surface of the base 110-2 so as to protect the first and second sense patterns (120, 140).

The investigation operation S740 for determining whether the first sense pattern 120 and the second sense pattern 140 are normally operated may be carried out prior to execution of the stacking operation (S750) of the insulation layer 150.

Figure 21:
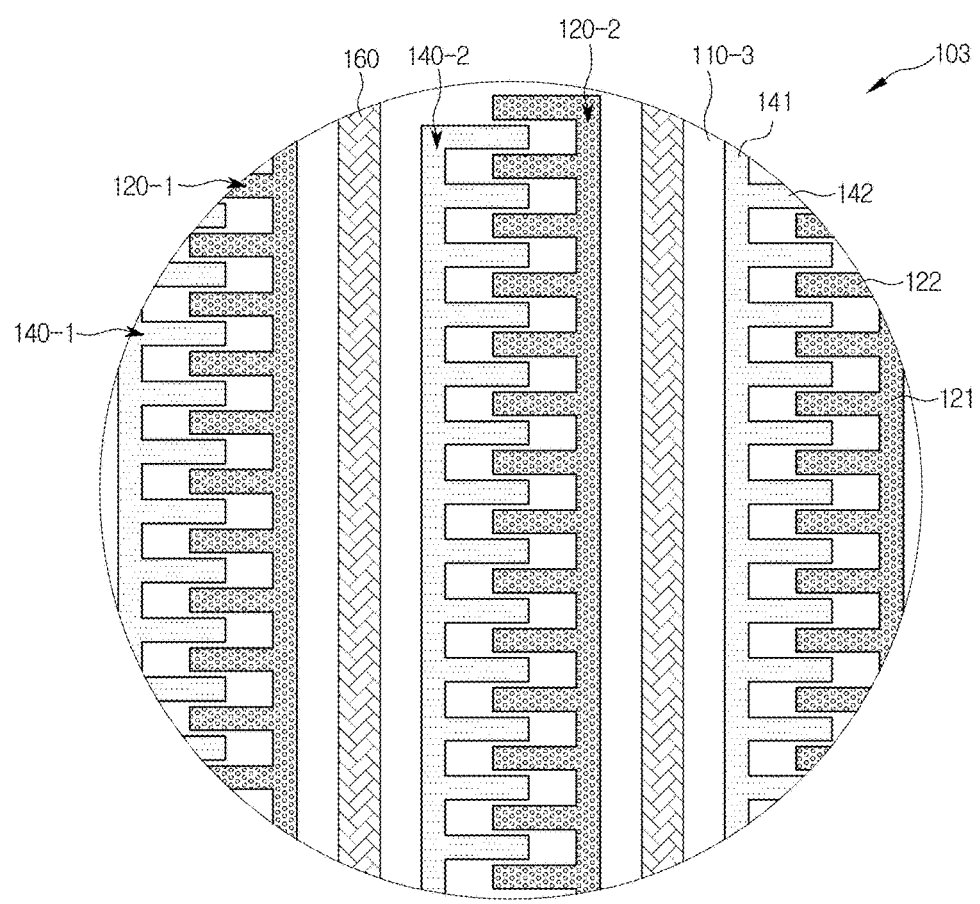
FIG. 21 is a plan view illustrating sense patterns of the touch input device according to a fourth embodiment of the present disclosure.

FIG. 21 is a plan view illustrating sense patterns of the touch input device 103 according to a fourth embodiment of the present disclosure.

As shown in FIG. 21, the touch input device 103 according to the fourth embodiment may include a first sense pattern 120 (120-1, 120-2) formed in the first pattern groove 111 (see FIG. 16) formed at one surface of the base 110-3, and a second sense pattern 140 (140-1, 140-2) formed in the second pattern groove 112 (see FIG. 16) formed at one surface of the base 110-3.

Each of the first sense pattern 120 and the second sense pattern 140 may include a plurality of columns. A column of one first sense pattern 120 and a column of one second sense pattern 140 adjacent to the first sense pattern 120 may form a single channel, and columns of the plurality of first and second sense patterns (120, 140) may form a plurality of channels.

For example, the first sense pattern 120 may include the (n−1)-th first sense pattern 120-1 and the n-th first sense pattern 120-2. The second sense pattern 140 may include not only the (n−1)-th second sense pattern 140-1 adjacent to the (n−1)-th first sense pattern 120-1, but also the n-th second sense pattern 140-2 adjacent to the n-th first sense pattern 120-2.

The first sense pattern 120 may include a trunk part 121 extending in one direction and a plurality of leg parts 122 branched in a direction perpendicular to the trunk part 121. The second sense pattern 140 may include a trunk part 141 extending in one direction and a plurality of leg parts 142 branched in a direction perpendicular to the trunk part 141. The leg parts 122 of the first sense pattern 120 and the leg parts 142 of the second sense pattern 140 may be arranged to face each other. The leg parts 142 of the plurality of second sense patterns 140 may be disposed between the leg parts 122 of the plurality of first sense patterns 120.

The touch input device 103 may include a ground line 160 disposed between the respective channels. Although not shown in the drawings, the ground line 160 may be provided in the ground pattern groove (not shown) formed at one surface of the base 110-3. The ground pattern groove may be formed by irradiating laser light, and the ground line 160 may be formed by the plating or deposition process.

That is, the ground line 160 may be formed using the same LDS scheme as in the first and second sense patterns (120, 140). In addition, the ground pattern groove may be formed by the same process as in the first and second pattern grooves (111, 112), and the ground line 160 may be formed by the same process as in the first and second sense patterns (120, 140).

The ground line 160 may be a ground (GND) electrode line. The ground line 160 may prevent occurrence of noise between adjacent channels. For example, the ground line 160 may prevent delivery of noise between the (n−1)-th first sense pattern 120-1 and the n-th second sense pattern 140-2.

The ground line 160 may be disposed between the first sense pattern 120 and the second sense patter 140 of different channels. For example, the ground line 160 may be arranged between the (n−1)-th first sense pattern 120-1 and the n-th second sense pattern 140-2. The ground line 160 may extend in a direction parallel to one direction along which the trunk parts (121, 141) of the first and second sense patterns (120, 140) are elongated.

Figure 22:
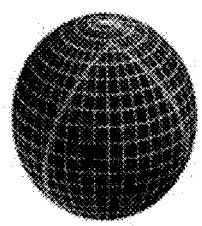
FIG. 22 is a view illustrating one example of a surface of a nonzero Gaussian curvature to which a touch input device is mounted according to an embodiment of the present disclosure.
Figure 22:
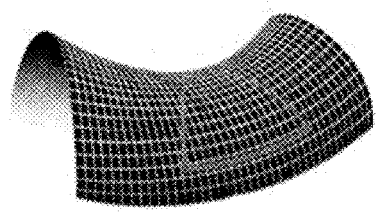

FIG. 22 is a view illustrating one example of a surface of a nonzero Gaussian curvature to which a touch input device is mounted according to an embodiment of the present disclosure.

The surface of nonzero Gaussian curvature may indicate a curved surface, Gaussian curvature of which is not zero. Alternatively, the surface of nonzero Gaussian curvature may also indicate a curved surface including at least two different curvatures. In FIG. 22, as an example of the surface of nonzero Gaussian curvature, FIG. 22(*a*) illustrates an example of a spherical surface, and FIG. 22(*b*) illustrates an example of a saddle-shaped surface.

The scope or spirit of the touch input device according to the embodiment of the present disclosure is not limited to the shapes of the sense patterns (120, 140), and the touch input device may be installed at the surface of nonzero Gaussian curvature.

Figure 23:
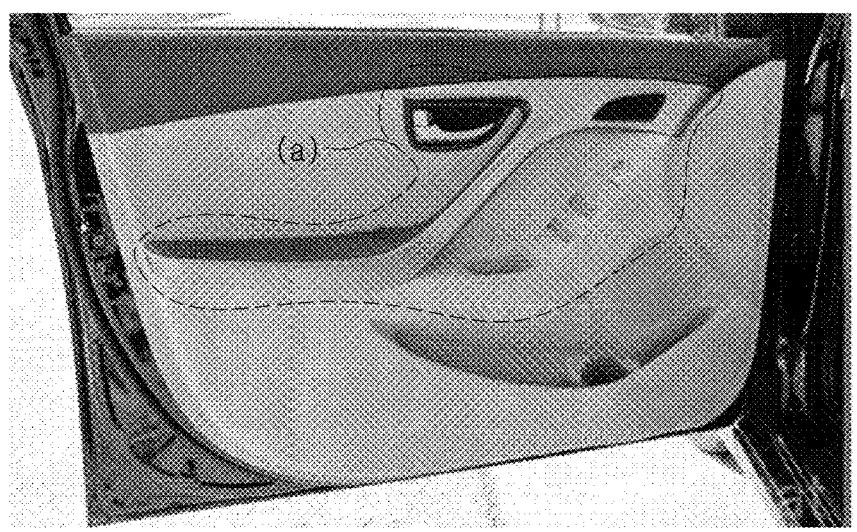
FIG. 23 is a view illustrating a vehicle's door trim to which a touch input device is mounted according to an embodiment of the present disclosure.

FIG. 23 is a view illustrating a vehicle's door trim (a) to which a touch input device is mounted according to an embodiment of the present disclosure.

The door trim (a) of the vehicle is formed in a complicated shape including the surface of nonzero Gaussian curvature or the single curvature surface, and the vehicle driver can easily approach the door trim (a), such that various manipulation devices may be installed in the door trim (a). Although not shown in the drawings, the touch input device according to the embodiment may be installed at the door trim (a) of the vehicle.

As is apparent from the above description, the touch input device according to the embodiments is manufactured using Laser Directing Structuring (LDS), such that the fabrication process is simplified and the production costs can be reduced.

In addition, the touch input device according to the embodiments can easily form the sense pattern even when a touch unit is formed to have a curved surface. Specifically, the touch input device can also form the sense pattern even when the touch unit is configured to have a double curved surface.

In addition, the touch input device according to the embodiments does not apply the adhesive or bonding process to a process of forming the sense pattern over a base, such that the touch input device can be protected from vibration or impact, resulting in increased durability thereof.

In addition, the touch input device according to the embodiments is manufactured under a high-heat condition based on laser light, such that product reliability can be increased even when products are used at high temperature.

In addition, one or more sense patterns may be directly formed in an injection-molded material, resulting in increased durability.

In addition, one or more sense patterns are formed in various shapes of an injection-molded material or in various types of an injection-molded material, such that the region to which a touch input device is applied can extend in size.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A touch input apparatus comprising:
a first base including a first metal compound;
a first pattern groove formed over one surface of the first base;
a first sense pattern formed over the first pattern groove and including a conductive material;
a second base stacked over the first base, and configured to include a second metal compound;
a second pattern groove formed over one surface of the second base;
a second sense pattern formed over the second pattern groove, including a conductive material, and spaced apart from the first sense pattern; and
a line unit connecting the first sense pattern and the second sense pattern to an integrated-circuit, wherein
a lower part of the first sense pattern is accommodated in the first pattern groove formed over a front surface of the base, and an upper part of the first sense pattern protrudes from the surface of the first base,
a lower part of the second sense pattern is accommodated in the second pattern groove formed over the surface of the base, and an upper part of the second sense pattern protrudes from the surface of the second base,
the first base is formed to have a thickness of X mm,
the first sense pattern protrudes from one surface of the first base by a thickness of a μm,
the second sense pattern is recessed from one surface of the second base by a thickness of b μm, and
the thickness (Y μm) of the second base satisfies the following Equation 1:

$(a+b)\mu m < Y \mu m < -1210\ \mu m*2(X\ mm-1.0\ mm)/1\ mm+1350\ \mu m.$  [Equation 1]

2. The touch input apparatus according to claim 1, wherein:
the first sense pattern and the second sense pattern are perpendicular to each other on the basis of the second base interposed therebetween.

3. The touch input apparatus according to claim 1, wherein:
the integrated-circuit is configured to receive signals regarding capacitance of the first sense pattern and the second sense pattern so as to interpret an input touch signal.

4. The touch input apparatus according to claim 3, wherein:

the first sense pattern includes a plurality of columns;
the second sense pattern includes a plurality of columns perpendicular to the first sense pattern on the basis of the second base interposed between the first and second sense patterns; and
the integrated-circuit is configured to interpret the input touch signal through capacitance information received from a plurality of intersection parts at which the first sense pattern and the second sense pattern are formed to cross each other.

5. The touch input apparatus according to claim 1, wherein each of the first and second bases includes:
a resin including at least one of: Polycarbonate (PC), Polyamide (PA), and acrylonitrile-butadiene-styrene copolymer (ABS); and
a metal oxide including at least one of: magnesium (Mg), chrome (Cr), copper (Cu), barium (Ba), iron (Fe), titanium (Ti), and aluminum (Al).

6. The touch input apparatus according to claim 5, wherein the first base is coated over a surface formed of a resin material, glass, or leather.

7. The touch input apparatus according to claim 1, wherein:
a half of the first sense pattern is accommodated in the first pattern groove, and the remaining half of the first sense pattern protrudes from one surface of the first base; and
a half of the second sense pattern is accommodated in the second pattern groove, and the remaining half of the second sense pattern protrudes from one surface of the second base.

8. The touch input apparatus according to claim 1, wherein:
the first sense pattern protrudes from one surface of the first base by a thickness of 10 μm, and the second sense pattern is recessed from one surface of the second base by a thickness of 10 μm.

9. The touch input apparatus according to claim 8, wherein:
the first base is formed to have a thickness range of 10 mm<X<1.55 mm.

10. The touch input apparatus according to claim 1, wherein:
the first base is formed to have a thickness of 1 mm;
the first sense pattern protrudes from one surface of the first base by a thickness of 10 μm, and the second sense pattern is recessed from one surface of the second base by a thickness of 10 μm; and
the thickness (Y μm) of the second base satisfies the following equation 2, $20\ \mu m < Y \mu m < 1350\ \mu m.$  [Equation 2]

11. The touch input apparatus according to claim 1, wherein:
the first base is formed to have a thickness of 1.5 mm;
the first sense pattern protrudes from one surface of the first base by a thickness of 10 μm, and the second sense pattern is recessed from one surface of the second base by a thickness of 10 μm; and
the thickness (Y μm) of the second base satisfies the following equation 3, $20\ \mu m < Y \mu m < 140\ \mu m.$  [Equation 3]

12. The touch input apparatus according to claim 1, wherein:
each of the first sense pattern and the second sense pattern is integrated with the line unit.

13. The touch input apparatus according to claim 12, wherein:
the first base is formed to extend to a region in which the line unit is provided.

14. A touch input apparatus comprising:
a first base, a top surface of which is used as a touch surface to which a touch signal is input, and configured to include a first metal compound;
a first pattern groove formed over a bottom surface of the first base;
a first sense pattern formed in the first pattern groove, and configured to include a conductive material;
a second base stacked over the bottom surface of the first base, and configured to include a second metal compound;
a second pattern groove formed over the bottom surface of the second base; and
a second sense pattern formed in the second pattern groove, including a conductive material, and spaced apart from the first sense pattern, wherein
a lower part of the first sense pattern is accommodated in the first pattern groove formed over a front surface of the base, and an upper part of the first sense pattern protrudes from the surface of the first base,
a lower part of the second sense pattern is accommodated in the second pattern groove formed over the surface of the base, and an upper part of the second sense pattern protrudes from the surface of the second base,
the first base is formed to have a thickness of X mm,
the first sense pattern protrudes from one surface of the first base by a thickness of a μm,
the second sense pattern is recessed from one surface of the second base by a thickness of b μm, and
the thickness (Y μm) of the second base satisfies the following Equation 1:

$(a+b)\mu m < Y \mu m < -1210 \ \mu m*2(X \text{ mm}-1.0 \text{ mm})/1 \text{ mm}+1350 \ \mu m.$ [Equation 1]

15. A touch input apparatus comprising:
a basic material, a top surface of which is used as a touch surface to which a user's touch signal is input;
a first base stacked over a bottom surface of the basic material, and configured to include a first metal compound;
a first pattern groove formed over a bottom surface of the first base;
a first sense pattern formed in the first pattern groove, and configured to include a conductive material;
a second base stacked over the bottom surface of the first base, and configured to include a second metal compound;
a second pattern groove formed over a bottom surface of the second base; and
a second sense pattern formed in the second pattern groove, including a conductive material, and spaced apart from the first sense pattern, wherein
a lower part of the first sense pattern is accommodated in the first pattern groove formed over a front surface of the base, and an upper part of the first sense pattern protrudes from the surface of the first base,
a lower part of the second sense pattern is accommodated in the second pattern groove formed over the surface of the base, and an upper part of the second sense pattern protrudes from the surface of the second base,
the first base is formed to have a thickness of X mm,
the first sense pattern protrudes from one surface of the first base by a thickness of a μm,
the second sense pattern is recessed from one surface of the second base by a thickness of b μm, and
the thickness (Y μm) of the second base satisfies the following Equation 1:

$(a+b)\mu m < Y \mu m < -1210 \ \mu m*2(X \text{ mm}-1.0 \text{ mm})/1 \text{ mm}+1350 \ \mu m.$ [Equation 1]

16. A method for manufacturing a touch input apparatus, comprising:
providing a first base including a first metal compound;
forming a first pattern groove by irradiating laser light to one surface of the first base;
forming a first sense pattern in the first pattern groove through a plating or deposition process;
stacking a second base including a second metal compound;
forming a second pattern groove by irradiating laser light to one surface of the second base;
forming a second sense pattern spaced apart from the first sense pattern over the second pattern groove through a plating or deposition process; and
providing a current to the first and second sense patterns, determining a change of capacitance between the two sense patterns, and determining whether the two sense patterns are used as a sensor on the basis of the determined change of capacitance, wherein
a lower part of the first sense pattern is accommodated in the first pattern groove formed over a front surface of the base, and an upper part of the first sense pattern protrudes from the surface of the first base,
a lower part of the second sense pattern is accommodated in the second pattern groove formed over the surface of the base, and an upper part of the second sense pattern protrudes from the surface of the second base,
the first base is formed to have a thickness of X mm,
the first sense pattern protrudes from one surface of the first base by a thickness of a μm,
the second sense pattern is recessed from one surface of the second base by a thickness of b μm, and
the thickness (Y μm) of the second base satisfies the following Equation 1:

$(a+b)\mu m < Y \mu m < -1210 \ \mu m*2(X \text{ mm}-1.0 \text{ mm})/1 \text{ mm}+1350 \ \mu m.$ [Equation 1]

17. The method according to claim 16, further comprising:
determining a change of mutual capacitance between the first and second sense patterns, and determining whether the first and second sense patterns are capable of being used as a sensor according to the determined change of mutual capacitance.

18. The method according to claim 16, wherein:
the first sense pattern and the second sense pattern are formed by a Laser Directing Structuring (LDS) method.

19. The method according to claim 16, further comprising:
investigating whether the second base has a constant thickness after stacking the second base.

\* \* \* \* \*